(12) United States Patent
Yin et al.

(10) Patent No.: US 12,399,091 B2
(45) Date of Patent: Aug. 26, 2025

(54) HARD TISSUE SLICE ANTI-FALLING PRETREATMENT DEVICE AND ANTI-FALLING PRETREATMENT METHOD

(71) Applicant: DPW (SHANGHAI) BIOTECHNOLOGY CO., LTD., Shanghai (CN)

(72) Inventors: Junhui Yin, Shanghai (CN); Changqing Zhang, Shanghai (CN)

(73) Assignee: DPW (SHANGHAI) BIOTECHNOLOGY CO., LTD., Shanghai (CN)

( * ) Notice: Subject to any disclaimer, the term of this patent is extended or adjusted under 35 U.S.C. 154(b) by 797 days.

(21) Appl. No.: 17/558,144

(22) Filed: Dec. 21, 2021

(65) Prior Publication Data

US 2022/0307950 A1 Sep. 29, 2022

(30) Foreign Application Priority Data

Mar. 24, 2021 (CN) .......................... 202110316227.7

(51) Int. Cl.
*B01L 9/00* (2006.01)
*G01N 1/04* (2006.01)
*G01N 1/31* (2006.01)
*G01N 1/36* (2006.01)
*G01N 1/30* (2006.01)

(52) U.S. Cl.
CPC ............... *G01N 1/312* (2013.01); *G01N 1/04* (2013.01); *G01N 1/36* (2013.01); *G01N 2001/305* (2013.01)

(58) Field of Classification Search
CPC ................................... B01L 9/52; B01L 9/527
See application file for complete search history.

(56) References Cited

U.S. PATENT DOCUMENTS

2014/0051118 A1* 2/2014 Matthiesen .............. G01N 1/30
435/40.5

* cited by examiner

*Primary Examiner* — Natalia Levkovich
(74) *Attorney, Agent, or Firm* — Ryan Dean; Umberg Zipser LLP

(57) ABSTRACT

The invention discloses a hard tissue slice anti-falling pretreatment device which comprises a box and a slice frame, a buffer plate is arranged in the box, and a plurality of small holes are evenly formed in the buffer plate; the bottom of the box is communicated with a liquid discharge pipe through a liquid outlet, and the liquid discharge pipe is provided with a valve; the slice frame is arranged on the buffer plate and comprises two longitudinal support frames and a plurality of layers of transverse support frames fixed between the two longitudinal support frames; each layer of transverse support frame comprises a plurality of first support rods, the gradient of each first support rod relative to the horizontal plane is 0-15 degrees.

9 Claims, 4 Drawing Sheets

HARD TISSUE SLICE ANTI-FALLING PRETREATMENT DEVICE AND ANTI-FALLING PRETREATMENT METHOD

BACKGROUND OF THE INVENTION

1. Field of the Invention

The invention relates to the technical field of slice anti-falling, and more particularly, to a hard tissue slice anti-falling pretreatment device and an anti-falling pretreatment method.

2. Description of the Related Art

For anti-falling glass slides available in the market, including positively charged anti-falling glass slides and lysine-treated anti-falling glass slides, and so on, anti-falling treatment is performed on the surface of the glass slides to improve the anti-falling performance of the slides. Those anti-falling glass slides have good anti-falling effects for paraffin sections and frozen sections. However, even the very expensive anti-falling glass slides are not able to resolve the problem of falling of the hard tissue slice. Such anti-falling glass slides are quite expensive, but anti-falling effect of the hard tissue slice is not obvious, and falling rate is still as high as 60% to 70%.

Since the hard tissue slice has a high dyeing falling rate, the dyeing success rate of the hard tissue slice is greatly reduced, so that the development of dyeing of the hard tissue slice is hindered. Thus, high dyeing falling rate of the hard tissue slice has always been a major obstacle to the development and progress of the hard tissue slice.

Therefore, one of the important areas of research is to provide a technical means through which dyeing falling rate of the hard tissue slice is reduced, and the dyeing success rate of the hard tissue slice is improved.

SUMMARY OF THE INVENTION

Given that the foregoing problems exist in the prior art, the present invention provides a hard tissue slice anti-falling pretreatment device and an anti-falling pretreatment method.

According to the first aspect of the invention, the invention provides a hard tissue slice anti-falling pretreatment device, comprising a box and a slice frame, a buffer plate is arranged in the box, and a plurality of small holes are evenly formed in the buffer plate; a box cover is arranged above the box, a bottom of the box is communicated with a liquid discharge pipe through a liquid outlet, and the liquid discharge pipe is provided with a valve;

the slice frame is arranged on the buffer plate and comprises two longitudinal support frames and a plurality of layers of transverse support frames fixed between the two longitudinal support frames; each layer of transverse support frame comprises a plurality of first support rods, the gradient of each first support rod relative to the horizontal plane is 0-15 degrees, the end, with the low horizontal height, of each first support rod extends upwards to form a baffle, and the other end of each baffle is fixed to a second support rod;

two ends of each longitudinal support frame are each provided with a vertical support rod, a plurality of second support rods are fixed in parallel between the two vertical support rods, the same ends of the plurality of first supports rods at the same layer are fixed on same second support rod.

Preferably, the number of the layers of transverse support frames is in a range from 3 to 8.

Preferably, the bottom of the box extends downwards from the liquid outlet to form a liquid discharge passage, a lower end of the liquid discharge passage is communicated with the liquid discharge pipe.

Preferably, a diameter of a lower end of the liquid discharge passage is gradually reduced, so that it equals to a diameter of the liquid discharge pipe.

Preferably, the box and the slice frame are made of glass, stainless steel or polytetrafluoroethylene.

Preferably, a valve seat is arranged on the liquid discharge pipe, the valve is sleeved on the valve seat, a through-hole is formed in the valve, when the valve is rotated inside the valve seat, the through-hole is communicated with or disconnected from the liquid discharge pipe.

Preferably, each of the plurality of small holes formed in the buffer plate has a diameter in a range from 0.5 mm to 3 mm.

According to the second aspect of the invention, the invention provides a method for anti-falling pre-treating hard tissue slice using the anti-falling pretreatment device described above, comprising the steps of:

Step S1, placing the hard tissue slice on the slice frame, and placing the slice frame in the box;

Step S2, after it is confirmed that the valve is closed, pouring first plastic removal liquid into the box from the top thereof until the hard tissue slice is immersed in the first plastic removal liquid;

Step S3, after hard tissue slice is immersed in the first plastic removal liquid for a period of time, opening the valve, collecting the first plastic removal liquid;

Step S4, pouring the second plastic removal liquid, anhydrous ethanol-acetone mixture and anhydrous ethanol in sequence, and repeating operations in Steps S2-S3; and Step S5, removing the hard tissue slice, encapsulating the slice with collodion glue, to obtain hard tissue slice undergoing anti-falling pretreatment.

By adopting the above-mentioned technical solutions, compared to the prior art, the present invention has the following technical effects:

(1) in the present invention, a specific device is provided and applied to the plastic removal process before the hard tissue slice is dyed, the probability of dyeing and slice removal is reduced from 70% to within 10%, the dyeing success rate of the hard tissue slice is greatly improved, and a huge progress space is provided for dyeing of the hard tissue slice.

(2) A buffer plate is arranged in the box, and a plurality of holes are densely formed in the buffer plate, so that flow direction of plastic removal liquid, anhydrous ethanol-acetone mixture and anhydrous ethanol etc. is changed when they are discharged; through the guidance of the small holes, liquid in the box only forms small eddies with soft undulations when flowing downwards, and large fluid fluctuation will not be created inside the box, so that anti-falling of the hard tissue slice can be achieved.

(3) The device can not only be applied to the pretreatment process before the hard tissue slice is dyed, but also be applied to the pretreatment process before paraffin sections and frozen sections are dyed.

(4) The anti-falling method provided in the present invention is different from the method provided in the prior art. In the prior art, anti-falling reagents are added to the slide surface or anti-falling treatment is performed on the surface. The former has the advantages of low cost, simple operation and excellent anti-falling effects.

Figure 1:
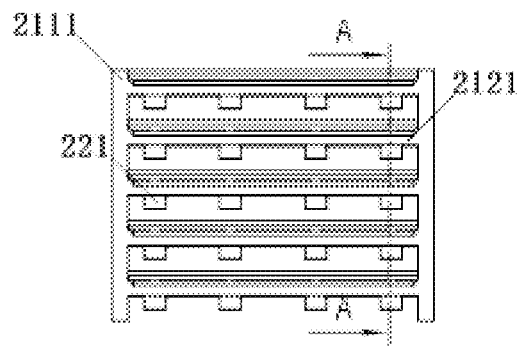
FIG. 1 is a front view illustrating a slice frame in the present invention.

LIST OF REFERENCE NUMERAL IN THE DRAWINGS 1 box, 11—buffer plate, 12—box cover, 13—liquid discharge outlet, 2—slice frame, 21—longitudinal support frame, 211—vertical support rod, 212—second support rod, 22—transverse support frame, 221—first support rod, 3—liquid discharge pipe, 4—valve.

DETAILED DESCRIPTION

When making slices or ultrathin slices, it is difficult to make slices with uniform thickness due to the fact that tissue is soft or tissue is partially soft or hard. Therefore, it is necessary to allow the interior of the tissue to be soaked with a certain material, so that uniform hardening of the entire tissue can be achieved to facilitate cutting into slices. Of note, the material here is called an embedding agent. Generally, paraffin, collodion, charcoal wax, gelatin, for example, are adopted as the embedding agent for the slices observed by an optical microscope; while epoxy resin, polystyrene resin, isobutylene resin and water-soluble resin are adopted as the embedding agent for the slices observed by an electron microscope.

Slices for HE staining, special staining or immunohistochemical staining must be subjected to the plastic removal process in advance. The falling rate of the hard tissue slice during its dyeing process is as high as 70% after it is subjected to plastic removal process by using the conventional method. Pretreatment process carried out before the dyeing process is improved by using a hard tissue slice anti-falling pretreatment device as shown in FIGS. 5-7 for the purpose of achieve anti-falling of the hard tissue slice.

The invention is illustrated in full details with reference to particular embodiments, so as to better understand the present invention, however, the invention is not limited to the following embodiments.

EXAMPLE 1

Figure 5:
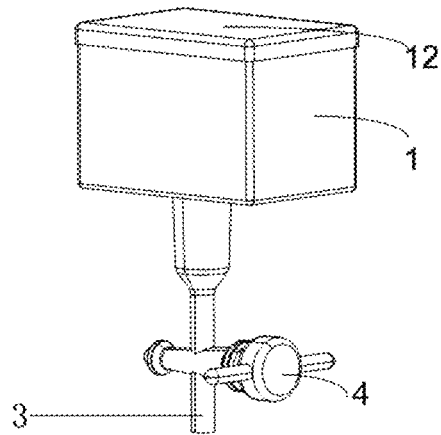
FIG. 5 is a schematic structural view illustrating a hard tissue slice anti-falling pretreatment device in the present invention.
Figure 6:
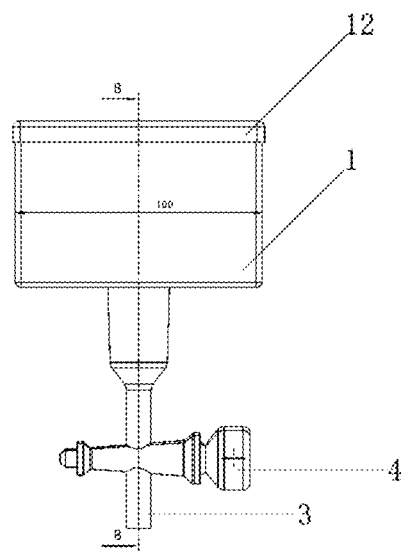
FIG. 6 is a front view illustrating the hard tissue slice anti-falling pretreatment device in the present invention.
Figure 7:
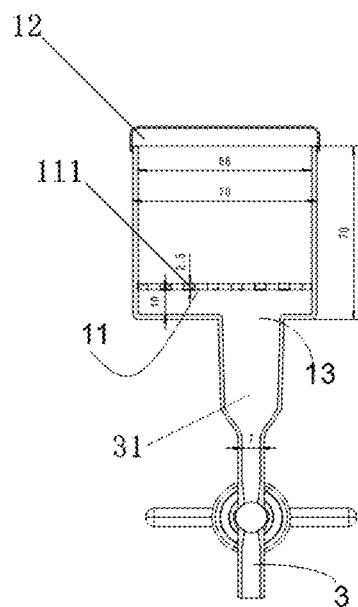
FIG. 7 is a schematic structural view taken along section B-B in FIG. 6.

As shown in FIGS. 5-7, this embodiment provides a hard tissue slice anti-falling pretreatment device, comprising a box 1 and a slice frame 2.

As shown in FIG. 7, a buffer plate 11 is arranged in the box 1 for carrying the slice frame 2. In a particular embodiment, the buffer plate 11 is a plate-like structure in which a plurality of holes are formed, and it is horizontally fixed at a lower part of the box 1, the buffer plate 11 divides the box 1 into an upper space and a lower space. Liquid flowing through the top of the box 1 flows from the upper space to the lower space through the holes in the buffer place 11. Preferably, each of the plurality of small holes formed in the buffer plate 11 has a diameter in a range from 0.5 mm to 3 mm. In the present invention, the buffer plate 11 is arranged in the box 1, and a plurality of holes are densely formed in the buffer plate, so that flow direction of plastic removal liquid, anhydrous ethanol-acetone mixture and anhydrous ethanol is changed when they are discharged; through the guidance of the small holes, liquid in the box 1 only forms small eddies with soft undulations when flowing downwards, and large fluid fluctuation will not be created inside the box, so that anti-falling of the hard tissue slice can be achieved. If the buffer plate 11 is not provided, liquid is discharged only though the liquid discharge outlet at the bottom of the box 1. In this case, a larger fluid spiral will be generated, strong fluid fluctuation is created in the box, which results in the falling of the slice in subsequent operations.

In this embodiment, as shown in FIG. 7, the buffer plate 11 is horizontally fixed at a distance of 10 mm from the bottom of the box. The buffer plate 11 has a thickness of 2.5 mm. The size is only a particular embodiment of the invention, and the invention is not limited to the above-mentioned size.

In a preferred embodiment, the box 1 is integrally formed with the buffer plate 11.

Figure 8:
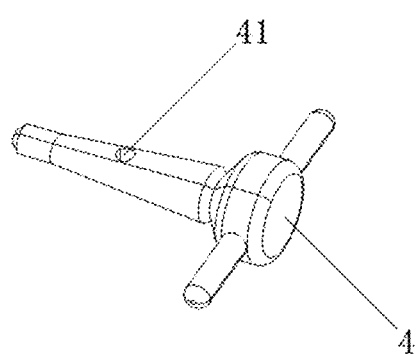
FIG. 8 is schematic structural view illustrating a valve in the present invention.

In this embodiment, as shown in FIG. 6, a box cover 12 is arranged above the box 1, the bottom of the box 1 is communicated with a liquid discharge pipe 3 through a liquid outlet 13, and the liquid discharge pipe 3 is provided with a valve 4; as shown in FIG. 6, a valve seat is arranged on the liquid discharge pipe 3, the valve 4 is sleeved on the valve seat; as shown in FIG. 8, a through-hole is formed in the valve 4, a knob on the valve 4 is turned so that the valve 4 is rotated in the valve seat. If it is necessary to discharge the liquid from the box 1, the valve 4 is rotated until the through-hole is communicated with the liquid discharge pipe. In addition, flow of the discharging liquid can be adjusted by turning the knob on the valve 4, so as to further control the flow of fluid in the box 1.

Specifically, as shown in FIGS. 6-7, the box has a length of 100 mm, a width of 70 mm, an internal width of 66 mm, a wall thickness of 2 mm, and a height of 70 mm; the above dimensions are only a specific embodiment of the present invention, and the present invention is not limited to the above-mentioned dimensions.

In this embodiment, as shown in FIG. 7, the liquid discharge pipe 3 has a diameter of 7 mm, and the dimension is only a specific embodiment of the present invention, and the present invention is not limited to the above-mentioned dimension.

Figure 2:
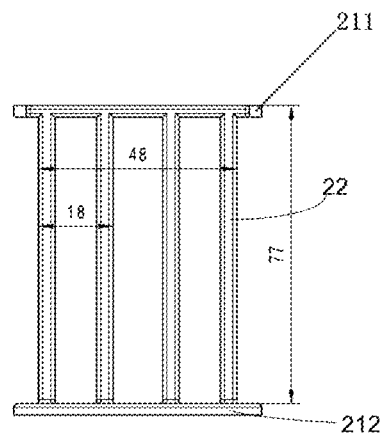
FIG. 2 is a top view illustrating the slice frame in the present invention.
Figure 4:
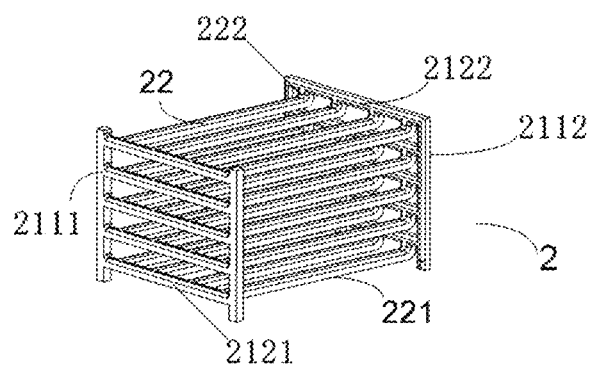
FIG. 4 is three-dimensional view illustrating the slice frame in the present invention.

In this embodiment, as shown in FIG. 4, the slice frame 2 comprises two longitudinal support frames 21 and a plurality of layers of transverse support frames 22 fixed between the two longitudinal support frames 21. As shown in FIG. 2, each layer of transverse support frame 22 comprises a plurality of parallel first support rods 221; in particular, in FIG. 2, each layer of transverse support frame 22 comprises four first support rods 221, the distance between two adjacent first support rods 221 is 18 mm, the farthest distance between two first support rods 221 is 48 mm, and each of the transverse support frames has a length of 77 mm.

Figure 3:
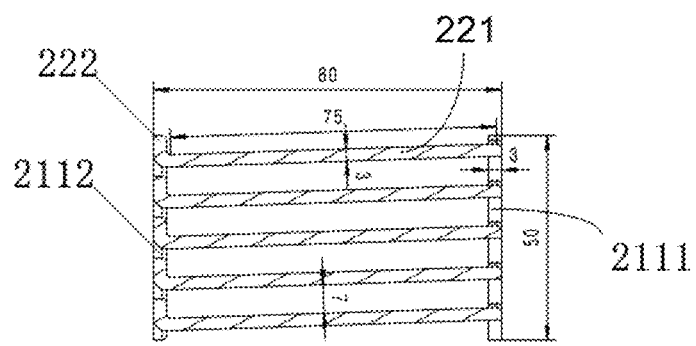
FIG. 3 is a schematic structural view taken along section A-A in FIG. 1.

As shown in FIG. 3, the distance between two adjacent layers of transverse support frames 22 is 7 mm, each of the first support rods 221 has a height of 3 mm, a straight section of the first support rod 221 has a length of 75 mm. The above dimensions are only a specific embodiment of the present invention, and the present invention is not limited to the above-mentioned dimensions.

In this embodiment, as shown in FIG. 4, two ends of each longitudinal support frame 21 are each provided with a vertical support rod 211, a plurality of second support rods 212 are fixed in parallel between the two vertical support rods 211, the same ends of the plurality of first supports rods 221 at the same layer are fixed on same second support rod 212. As shown in FIG. 3, each of the vertical support rods 211 has a height of 50 mm, a width of 3 mm, and the slice frame 2 has a total width of 80 mm. The above dimensions are only a specific embodiment of the present invention, and the present invention is not limited to the above-mentioned dimensions.

In this embodiment, as shown in FIG. 3, one end of the first support rod 221 is fixed to a side, facing the first support rod 221, of the second support rod 212, and the other end of the first support rod 221 extends upwards to form a baffle and it is fixed to a lower surface of the second support rod 212, the gradient of each first support rod 221 relative to the horizontal plane is 0-15 degrees, the end, to which the baffle is fixed, is lower than the other end, that is, the heights of the second support rod 212 at two ends of the same first support rod 221 can be the same or can be varied. In a preferred embodiment, the baffle at the lower side has a height of 1 mm to 3 mm, so as to ensure the slice will not easily slide out of a track. The baffle can be arc-shaped or can be perpendicular to the first support rods 221.

In this embodiment, as shown in FIG. 2, the number of the layers of transverse support frames 22 is in a range from 3 to 8. Further preferably, the number is 5, and the height between two layers is 7 mm. The height can be selected freely according to the number of the glass slides in different applications.

In this embodiment, as shown in FIG. 5, in a preferred embodiment, the bottom of the box 1 extends downwards from the liquid discharge outlet 13 to form a liquid discharge passage, a diameter of a lower end of the liquid discharge passage is gradually reduced, so that it equals to a diameter of the liquid discharge pipe, the lower end of the liquid discharge passage is communicated with the liquid discharge pipe 3.

In a particular embodiment, the box 1 and the slice frame 2 are made of glass, stainless steel or polytetrafluoroethylene. Furthermore, for the sake of costs, they are made of glass.

In a preferred embodiment, the length, width, and height of the box 1, the length, width, and height of the slice frame 2, and the number of layers can be selected according to the number of slices to be processed.

EXAMPLE 2

The invention provides a method for anti-falling pretreatment of hard tissue slice using the anti-falling pretreatment device provided in Example 1, wherein, for example, the pretreatment is done in prior to the HE staining of the hard tissue slice, the method comprises the steps of:

Step S1, placing the hard tissue slice on the slice frame 2, with 2 hard tissue slices on each layer of the slice frame 2, a total of 10 slices (which can be adjusted according to the requirement) on five layers of the slice frame 2, and placing the slice frame 2 in the box 1;

Step S2, after it is confirmed that the valve 4 is closed, pouring first plastic removal liquid into the box 1 from the top thereof until the hard tissue slice is immersed in the first plastic removal liquid;

Step S3, performing the plastic removal process for 10 minutes, opening the valve 4, so that the first plastic removal liquid flows slowly into a collection bottle, after the first plastic removal liquid all flows out, re-tightening the valve 4;

Step S4, pouring the second plastic removal liquid, anhydrous ethanol-acetone (at a ratio of 1:1) mixture and anhydrous ethanol in sequence, and repeating operations in Step S2-Step S3;

Step S41, pouring the second plastic removal liquid, performing the plastic removal process for 10 minutes, opening the valve 4, so that the second plastic removal liquid flows slowly into the collection bottle, after the second plastic removal liquid all flows out, re-tightening the valve 4;

Step S42, pouring the anhydrous ethanol-acetone (at a ratio of 1:1) mixture, immersing it for two minutes, opening the valve 4, so that the anhydrous ethanol-acetone (at a ratio of 1:1) mixture flows slowly into the collection bottle, after the anhydrous ethanol-acetone (at a ratio of 1:1) mixture all flows out, re-tightening the valve 4;

Step S43, pouring the anhydrous ethanol, immersing it for two minutes, opening the valve 4, so that the anhydrous ethanol flows slowly into the collection bottle, after the anhydrous ethanol all flows out, re-tightening the valve 4; and Step S5, removing the hard tissue slice, encapsulating the slice by pipetting collodion glue at a concentration of 0.25% to 5% to an observation area of the slice, to obtain hard tissue slice undergoing anti-falling pretreatment.

The above descriptions of the embodiments of the invention are only examples, and the invention is not limited to the above-mentioned embodiments. Those skilled in the art should be able to realize that the equivalent modifications and alternations to the invention are within the scope of the invention. Thus, all the equivalent modifications or variations are within the scope of the invention without departing from the spirit and scope of the invention.

What is claimed is:

1. A pretreatment device for preventing detachment of hard tissue sections, comprising:
   a housing (1) and a section rack (2) for holding the hard tissue sections;
   wherein the housing (1) is provided with a cushioning plate (11) for supporting the section rack (2), the cushioning plate (11) being a plate-shaped structure uniformly perforated with a plurality of apertures (111);
   the housing (1) is provided with a cover (12) on its upper side, and a bottom of the housing (1) is in communication with a drain pipe (3) through a liquid outlet (13), the drain pipe (3) being provided with a valve (4);
   wherein the section rack (2) is placed on the cushioning plate (11), the section rack (2) comprising a first longitudinal support frame (211), a second longitudinal support frame (212), and multi-layer transverse support frames (22) fixed between the first longitudinal support frame (211) and the second longitudinal support frame (212);

the first longitudinal support frame (211) consists of two first vertical support rods (2111) and a plurality of second support rods (2121) fixed in parallel between the two first vertical support rods (2111);

the second longitudinal support frame (212) consists of two second vertical support rods (2112) and a plurality of third support rods (2122) fixed in parallel between the two second vertical support rods (2112);

each transverse support frame (22) consists of a plurality of first support rods (221), each first support rod (221) being inclined at 0-15° relative to a horizontal plane, the first support rod (221) having a first end at a relatively lower horizontal elevation and a second end at a relatively higher horizontal elevation, the first end of the first support rod (221) extending upward to form a baffle (222), the first end of each first support rod (221) being fixed to one of the second support rod (2121) through the baffle (222), the second end of each first support rod (221) being fixed to one of the third support rod (2122), and all first support rods (221) within the same transverse support frame (22) being collectively fixed to either a single second support rod (2121) or a single third support rod (2122).

2. The pretreatment device of claim 1, wherein the baffle (222) is arcuate, and a height of the baffle (222) ranges from 1 mm to 3 mm.

3. The pretreatment device of claim 1, wherein the cushioning plate (11) is horizontally fixed at a position 8-15 mm away from the bottom of the housing (1).

4. The pretreatment device of claim 1, wherein a number of layers of the transverse support frames (22) is 3-8.

5. The pretreatment device of claim 1, wherein the bottom of the housing (1) extends downward from the liquid outlet (13) to form a liquid discharge channel (31), a lower end of the liquid discharge channel (31) is in communication with the drain pipe (3).

6. The pretreatment device of claim 5, wherein a diameter of the lower end of the liquid discharge channel (31) tapers down to match that of the drain pipe (3).

7. The pretreatment device of claim 1, wherein material of the housing (1) and the section rack (2) is glass, stainless steel, or polytetrafluoroethylene.

8. The pretreatment device of claim 1, wherein the drain pipe (3) is provided with a valve seat, the valve (4) is mounted within the valve seat, and the valve (4) is provided with a through-hole (41);

wherein, by rotating the valve (4), the through-hole (41) is brought into communication with or is cut off from the drain pipe (3).

9. The pretreatment device of claim 1, wherein diameter of each aperture (111) on the cushioning plate (11) ranges from 0.01 mm-3 mm.

\* \* \* \* \*